United States Patent [19]
Carroll et al.

[11] 3,866,471
[45] Feb. 18, 1975

[54] PROGRESSIVE DIE

[75] Inventors: William M. Carroll, Milwaukee;
Guntis M. Aulis; Francis C. Starr,
both of Menomonee Falls, all of
Wis.

[73] Assignee: Kaller Die & Tool Company,
Milwaukee, Wis.

[22] Filed: Dec. 3, 1973

[21] Appl. No.: 420,963

[52] U.S. Cl.................... 72/337, 72/324, 72/332,
72/405, 113/116 Y
[51] Int. Cl............................................ B21d 28/00
[58] Field of Search............ 72/332, 335, 337, 324,
72/316, 168, 427, 384, 405; 29/200 B, 203
L, 203 D; 113/116 V, 116 Y, 1 N, 1 R

[56] References Cited
UNITED STATES PATENTS
1,721,810 7/1929 Carter................................. 72/427
1,780,012 10/1930 Fine..................................... 72/427
3,039,187 6/1962 Kennedy............................. 72/337
3,430,410 3/1969 Heisler.............................. 113/1 R
3,739,622 6/1973 Overway............................. 72/337

Primary Examiner—C. W. Lanham
Assistant Examiner—James R. Duzan

[57] ABSTRACT

This disclosure relates to a progressive die. It includes upper and lower die shoes adapted to be mounted within a press which carries sub-assemblies for first forming a plurality of dissimilar metal piece parts of flat sheet metal, subsequently performing metal working operations on the parts and then assembling same upon ejection of the parts from the die.

8 Claims, 7 Drawing Figures

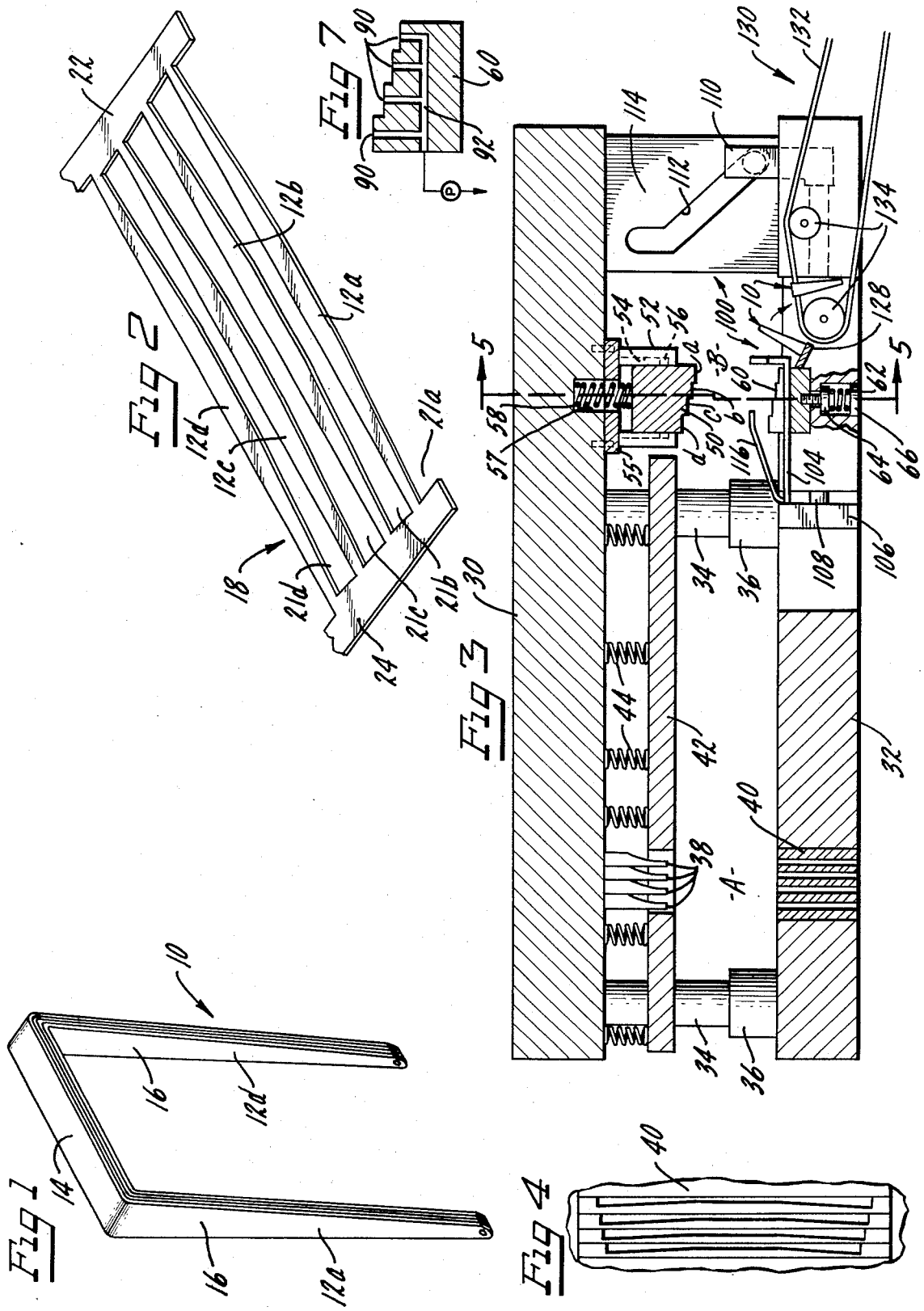

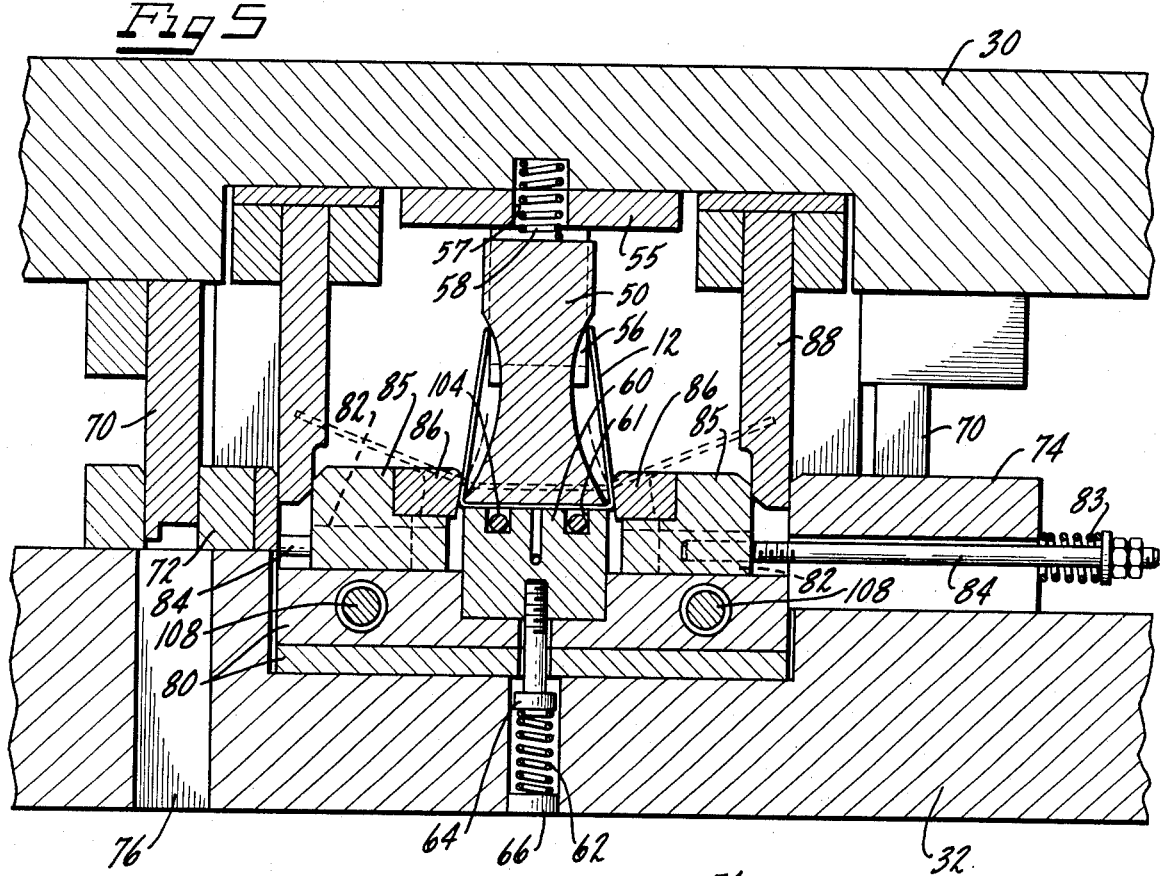
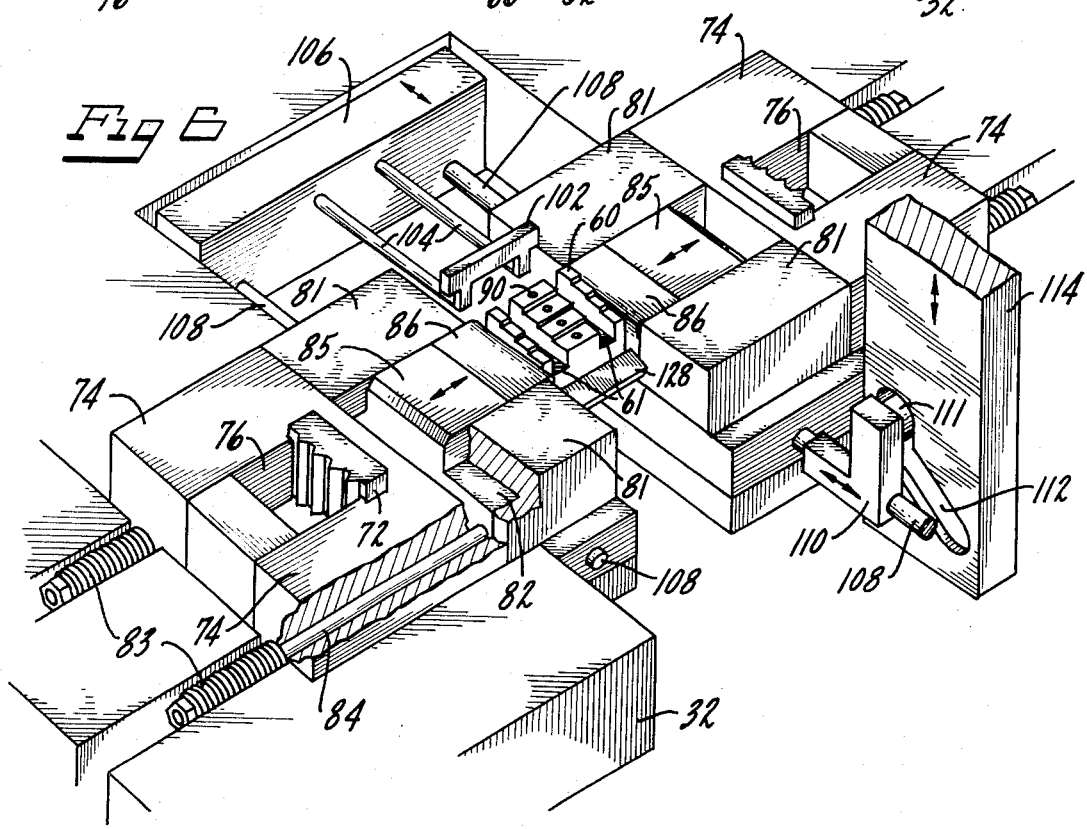

PROGRESSIVE DIE

BACKGROUND OF THE INVENTION

This invention relates to a progressive die for the manufacture of metal piece part assemblies. More specifically, it relates to a die which simultaneously forms a plurality of piece parts from sheet metal strip, subsequently works the parts in some fashion (such as bending) and then assembles the parts into a sub-assembly.

Most progressive dies form a single piece part. When several dissimilar parts are used in combination, separate dies must be utilized. These parts must then be sorted, and assembled, requiring numerous separate and sequential handling operations.

SUMMARY OF THE INVENTION

In order to reduce the costs of manufacture and assembly of piece part combinations, the instant invention includes a single progressive die which may include a stamping station and a material working station which also contains an assembly and ejection unit. At each station, operations are simultaneously performed on a plurality of dissimilar parts. The die unit includes upper and lower die shoes which mount opposing die units for first stamping a plurality of parts in a flat metal sheet; material working dies including vacuum means for holding and working the parts; and finally, a cam operated ejector which assembles the parts.

Accordingly, it is an object of our invention to provide a progressive die which simultaneously forms a plurality of parts, performs metal working operations on the parts and then assembles same in stacked relation. A further object is to provide a vertically reciprocal die in which each of the above functions is effected upon reciprocation of the die unit. Another object is to provide work holding means in the form of a vacuum unit to hold the piece parts for the metal working and assembly operations.

DESCRIPTION OF THE DRAWINGS

These and other objects will become clear upon consideration of the following specifications and drawings in which:

FIG. 1 is a perspective view of a piece part assembly made from dissimilar parts with the use of the instant invention;

FIG. 2 is a perspective view of a flat metal sheet in which the parts are partially formed;

FIG. 3 is a side elevational view of a preferred embodiment of the instant invention;

FIG. 4 is a plan view of the female die elements of the instant invention;

FIG. 5 is a side elevational view of the preferred embodiment of the instant invention generally taken through the line 5—5 of FIG. 3;

FIG. 6 is a preferred embodiment of a perspective of a portion of the lower die shoe and its components; and FIG. 7 is a symbolic view of the vacuum system of the instant invention.

DETAILED DESCRIPTION

The instant invention may be used to make many types of piece part assemblies. One such assembly 10 is illustrated in FIG. 1 and comprises four piece parts 12 stacked inside one another, each part having a horizontal portion 14 and two vertical legs 16. To make this assembly, the progressive die of the instant invention first stamps four blanks into a flat sheet material to define piece parts 12a, b, c and d; then holds and bends the legs 16 at another station, and finally stacks the parts upon ejection.

To perform these operations sheet material 18 (FIG. 2) is fed into the left end of the die (FIG. 3) by a conventional stock feed device of a press. With the material feeding from left to right as viewed in FIG. 3, a stamping station A first punches blanks into the feed stock to partially form dissimilar piece part blanks 12 a, b, c and d which are carried by carrier strips 22 and 24 to the material working station B. Here, the piece parts are severed from the carrier strips and bent into the U-shape of FIG. 1. Subsequently, an ejection stacks and discharges the piece part assembly in the form depicted in FIG. 1.

As illustrated in FIG. 3, the preferred embodiment of the invention comprises upper and lower die shoes 30 and 32 which are adapted to be inserted into a vertically reciprocal press (not shown). Leader pins and collars 34, 36 then guide the upper shoe 30 for vertical movement relative to lower die shoe 132. Mounted upon upper shoe 30 at station A is a set of punches 38 adapted to cooperate with female die unit 40 to punch out blanks 21a, b, c and d (FIG. 2) to partially form the piece parts 12a, b, c and d. A stripper plate 42 is mounted by springs 44 to the upper die shoe 30 and acts to first flatten the strip material 18 and then strip same from the punches 38 as the press moves die shoe 30 upward. The female die unit 40, as illustrated in FIG. 4, may be separately formed and inserted by set screws (not shown) into the lower die shoe.

After the blanks have been punched at station A, carrier strips 22 and 24 move the partially formed piece parts 12a, b, c and d to station B. Here, a forming punch 50 coacts with a pressure pad 60 and other elements subsequently described to bend the blanks 12a, b, c and d into the shape depicted in FIG. 1. As shown in FIG. 3, the forming punch 50 and the pressure pad 60 have four distinct surfaces a, b, c and d elevated from one another. These surfaces may be formed upon a single die block, or separately made and assembled with set screws. Each of these vertically spaced surfaces will receive a partially formed piece part 12 at its center or horizontal portion 16. Thus, one of the four partially formed parts of FIG. 2 will engage one of the four stepped surfaces. This forming operation will subsequently become clear in the discussion relating to FIGS. 5 and 6. However, with continuing reference to FIG. 3, it should be noted that the forming punch 50 is mounted for relative vertical reciprocation with respect to die shoe 30 by depending flanges 52 extending downward on each side of the punch from a mounting plate 55. Each flange 52 is provided with a groove 54 which receives a key 56 fixed to the forming punch 50 for vertically guiding the punch. Within upper die shoe 50 is a counter bore 57 receiving a spring or biasing unit 58 to act against the upper surface of forming punch 50 urging the punch downwardly such that the keys 56 normally rest at the lower end of the grooves 54. Similarly, pressure pad 60 is biased upwardly by a spring 62 which is interposed within a bore of die shoe 32 between a bolt 64 attached to pad 60 and a plug 66.

After the piece parts are converted to the U-shape structure of FIG. 1 by the forming punch and other components subsequently described, an ejector assembly 100 stacks the parts one upon the other to assemble them in the form depicted in FIG. 1. This assembly comprises a reciprocal stacking plate 102 carried by two arms 104 extending forward from a carrier plate 106. This carrier plate is reciprocated by guide rods 108 attached to a connecting link 110 which is engaged with a cam slot 112 of cam 114 attached to upper die shoe 30. Thus, downward movement of die shoe 30 causes the carrier plate 106 to move to the left from the position shown in FIG. 3. A guide spring 116 also mounted on the center of the carrier plate 106 will guide the partially formed blanks 12a, b, c and d over the forward edge of pressure pad 60. Subsequently, on the upward stroke of die shoe 30, the ejector assembly is moved to the right to the position shown in FIG. 3 to stack and discharge the completed assembly to a discharge conveyor unit 130 which comprises a belt 132 driven about pulley wheels 134.

Thus, FIG. 3 generally describes the flow of sheet material through the die. Referring now to FIGS. 5 and 6, the details of the forming and ejection stations will be explained. In both of these figures, the upper die shoe 30 is illustrated in its downward position. However, during its downward movement, four metal piece parts 12a, b, c and d were moved by carrier strips 22 and 24 onto the four vertical steps of pressure pad 60 and the ejector assembly was retracted to the position shown in FIG. 6. During such downward movement the forming punch 50 first contacts pressure pad 60 to rigidly hold the piece parts. Next a trim punch 70 engages a female die 72 carried by lower shoe 32 to trim the carrier strips 22 and 24 from each of the four piece parts 12a, b, c and d. The female die 72 is carried by a block 74 which is rigidly mounted to the lower base 32. Apertures 76 in these blocks permit the carrier strips 22 and 24 to be discharged downwardly.

After these carrier strips are trimmed, the upper shoe 30 continues its downward movement. At this point, the legs 16 of the piece parts 12 are lying across the pressure pad 60 and cam means 82 on each side thereof. These cam means are mounted upon supports 80 (FIG. 5) within die shoe 32 and are adapted to reciprocate within mounting blocks 81 to the position shown in FIGS. 5 and 6. These cam means 82 are biased outwardly by compression springs 83 mounted on bolts 84 which extend from the cam means 82 through blocks 74. A shoulder 85 on these cam means 82 extends upwardly and carries a bending surface 86. Thus, as the forming die 50 continues its downward movement, the legs 16 of pieces 12 are bent upward by camming surfaces 86 as shown by the dotted line position in FIG. 5. Continued downward movement causes cams 88 attached to upper shoe 30 to engage the rear surface of cam shoulder 85 to urge them inwardly against the bias of springs 83. This inward movement causes the legs 16 of pieces 12a, b, c and d to take the shape shown by full lines in FIG. 5.

After this bending action, the press has completed its downward stroke and moves upward, the upward movement permitting the forming punch and pressure pad to move upward. After a small distance, the cams 88 disengage from the shoulders 85 to permit the springs 83 to retract the cam means 82. Subsequently, the forming die 50 disengages from the piece parts 12 and pressure pad 60. At this point, a vacuum system holds one piece part attached to each stepped surface of pressure pad 60. This system is depicted in FIG. 7 in which a pump (P) applies a vacuum to apertures 90 on each stepped surface of the pad 60 through a conduit 92.

Continued upward movement of die shoe 30 causes the cam slot 112 to urge roller 111 to move the connecting link 110, rods 108 and the carrier plate 106 to the right as viewed in FIGS. 3 and 6. Thus, the arms 104 and the stacking plate 102 are moved through two slots 61 of pad 60 to serially engage the four piece parts 12, stacking them in the assembly shown in FIG. 1. Continued movement of the stacking plate causes the assembled piece parts to fall upon a material guide 128 and upon conveyor belt 132.

Thus, this invention discloses means within a single progressive die for stamping a plurality of piece parts, performing material working operations thereon and then assembling the piece parts prior to ejection from the die. The invention may take many forms and may be used to manufacture diverse assemblies. For example, the sheet material may be conveyed through the die on spring loaded lifters and different material work operations can be performed on the piece parts such as the forming of tabs, and other bending operations.

What we claim is:

1. A progressive die for stamping, forming and stacking metal piece parts comprising:
   a. an upper and lower die shoe adapted to be mounted in a vertically reciprocal press and to receive flat sheet metal;
   b. opposing die means carried by said die shoes for simultaneously forming a plurality of parts in said sheet metal;
   c. forming dies carried by said die shoes for receiving and performing metal working operations upon said parts, and said dies including vacuum means for positively holding said simultaneously formed parts vertically disposed relative to one another; and
   d. horizontally reciprocable cam operated stacking means carried by one of said die shoes cooperating with said vacuum means for stacking said parts and ejecting same from said die.

2. An apparatus as recited in claim 1 in which:
   a. said forming dies and said stacking means are connected to and actuated by vertical movement of said upper die shoe.

3. An apparatus as recited in claim 1 in which:
   a. each of said forming dies has a stepped surface for receiving one of said parts, and said vacuum means extends through said surface to hold said parts; and
   b. said stacking means is adapted to strip said parts from said stepped surface in stacked relation to one another.

4. An apparatus as recited in claim 2 in which:
   a. said forming dies have a plurality of vertically stepped horizontal surfaces for receiving said plurality of parts; and
   b. said vacuum means applies a vacuum to said surfaces for holding the parts thereon.

5. A progressive die for stamping and stacking dissimilar metal parts comprising:
   a. upper and lower die shoes adapted to be mounted in a reciprocal press and to receive flat metal stock;
   b. opposing die means carried by said die shoes for simultaneously punch forming and plurality of dissimilar metal parts in said metal stock;
   c. a plurality of stepped horizontal vacuum holding surfaces carried by one of said shoes for simultaneously receiving and holding a plurality of dissimilar metal parts; and d. reciprocal ejector means cooperating with said stepped vacuum molding surfaces carried by one of said die shoes for removing said metal parts from said surfaces in vertically stacked relation.

6. An apparatus as recited in claim 5 in which:

a. said ejector means comprises a stripping surface for stripping said piece parts from said holding surfaces.

7. An apparatus as recited in claim 5 in which:

a. said die shoes include means adjacent said holding surfaces for simultaneously bending said piece parts.

8. An apparatus as recited in claim 7 in which said means for bending said piece parts comprises:

a. a forming punch carried by said upper die shoe;

b. said holding surfaces are carried on said lower die shoe; and c. cam means carried by said lower die shoe for movement in a direction normal to said holding surfaces for bending said parts about said forming punch.

* * * * *